United States Patent [19]
Herman et al.

[11] Patent Number: 4,766,433
[45] Date of Patent: Aug. 23, 1988

[54] OPTICAL CARD-KEY DATA CONNECTOR

[75] Inventors: Robert W. Herman, Laguna Beach; Rex K. Lee, Laguna Hills, both of Calif.

[73] Assignee: Codercard, Inc., Costa Mesa, Calif.

[21] Appl. No.: 628,234

[22] Filed: Jul. 6, 1984

[51] Int. Cl.[4] ............................................. H04Q 1/00
[52] U.S. Cl. .................................. 340/825.31; 70/278; 340/825.3
[58] Field of Search ..................... 340/825.3, 825.31; 70/277, 453, 278; 361/147, 172; 339/12 R, 12 G

[56] References Cited
U.S. PATENT DOCUMENTS

| | | | |
|---|---|---|---|
| 2,170,287 | 8/1939 | Kinnebrew | 339/12 R |
| 3,683,239 | 8/1972 | Sturman | 361/147 |
| 3,786,391 | 1/1974 | Mathauser | 339/12 R |
| 3,808,577 | 4/1974 | Mathauser | 339/12 R |
| 3,810,258 | 5/1974 | Mathauser | 339/12 R |
| 4,211,456 | 7/1980 | Sears | 339/12 R |
| 4,250,533 | 2/1981 | Nelson | 70/278 X |
| 4,288,780 | 9/1981 | Theodoru et al. | 340/825.31 |
| 4,500,881 | 2/1985 | Beane | 339/12 R X |

FOREIGN PATENT DOCUMENTS 2213533 8/1973 Fed. Rep. of Germany ........ 70/270
WO8300976 3/1983 PCT Int'l Appl. .

OTHER PUBLICATIONS

R. T. Chase et al., "Security Identification and Lock-Actuating Device", IBM Tech. Disc. Bulletin, vol. 11, No. 7, Dec. 1968, pp. 738, 739.

Primary Examiner—Ulysses Weldon
Attorney, Agent, or Firm—Lyon & Lyon

[57] ABSTRACT

A card-key device with an embedded microprocessor is able to communicate with a computer-based security system via an optical connection. The optical connection is made by linking a light-emitting diode with a phototransistor through a "light tunnel" created by a mechanical connection. Electromagnetic sensors and grippers are used to assure each side of the connection that a valid connection has been made, as well as to supply power to the card-key on-board microprocessor. The card-key's on-board microprocessor can be used to retrieve an identifying number, to store data for the security system, or to perform other data transformation functions for the security system.

3 Claims, 2 Drawing Sheets

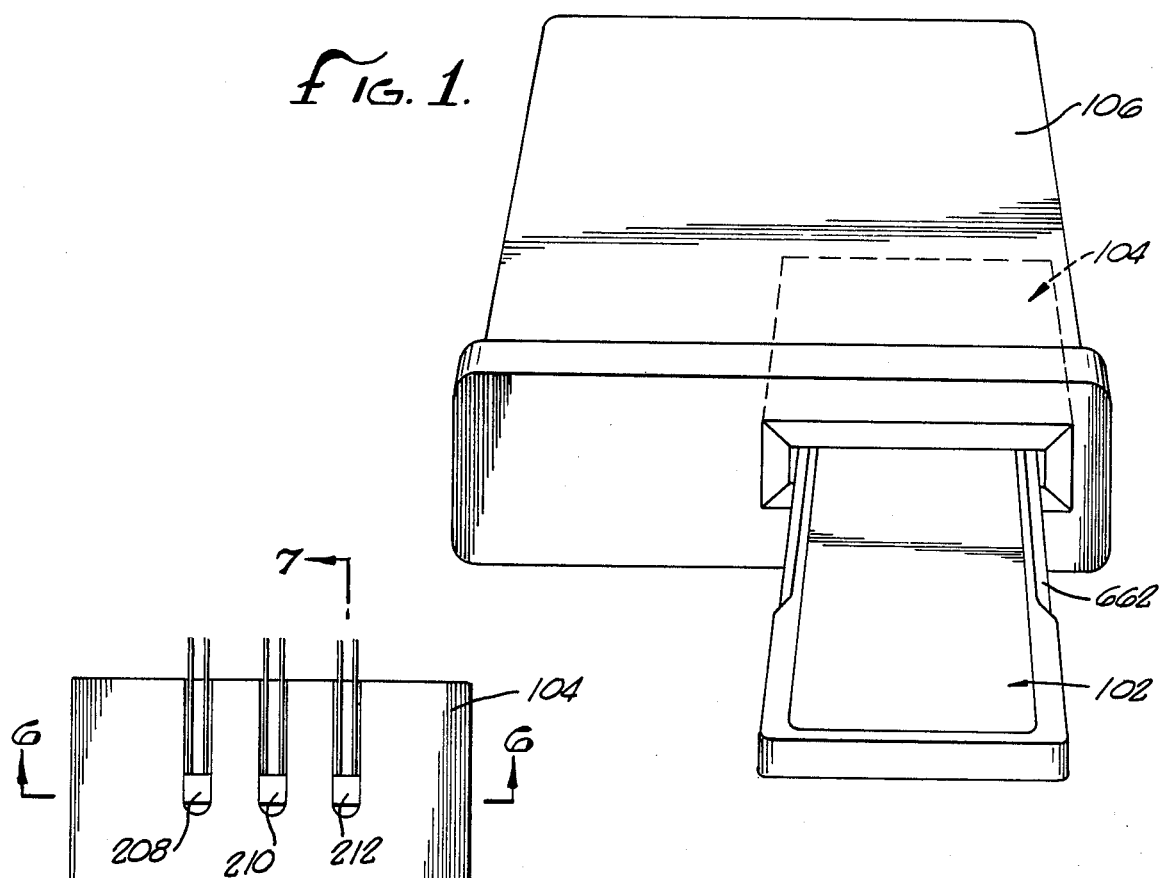
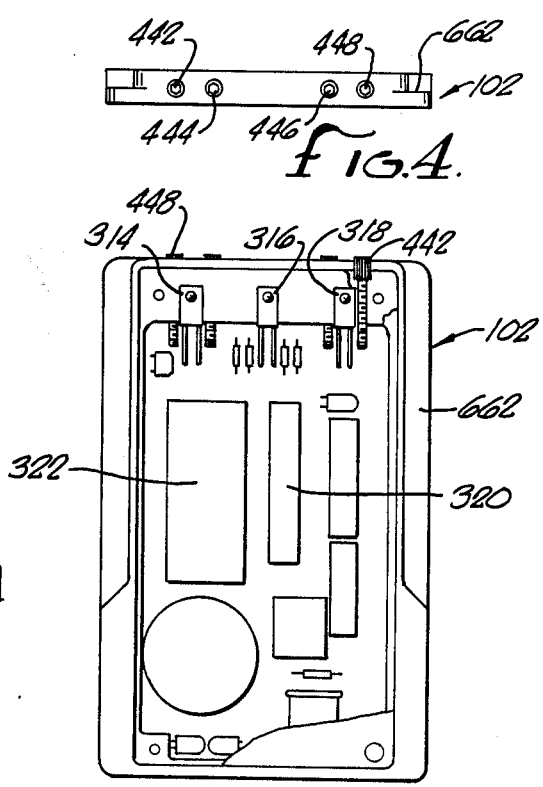
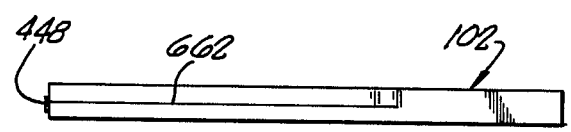

OPTICAL CARD-KEY DATA CONNECTOR

BACKGROUND OF THE INVENTION

Field of the Invention

The present invention relates to the field of card-key security devices. More specifically, it relates to the field of data connections between card-key embedded microprocessors and computer-based security systems.

General Background

The problem of access control—limiting access to certain locations to only authorized persons—has been with us since time immemorial. Recently, the age-old system of lock and key has been commonly replaced and improved upon by the computer-controlled security system. These systems often employ a data-laden device called a "card-key" to identify the person requesting access. It is easy to see how this method of access control is superior to the lock and key system, since card-keys can be individually and easily monitored, can be adjusted to employ different degrees of allowed entry, and can be "turned off" if lost or stolen.

One problem which has come to be recognized with respect to card-key systems is that repeated use can lead to mechanical degradation of the data connection, with consequent degradation in reliability. The present invention obviates this problem via the use of an optical connection which is minimally subject to mechanical wear and tear.

Another problem which has come to be recognized with respect to card-key systems is that they are quite sensitive to small misalignments when used. The present invention obviates this problem via the use of a magnetic connection which selfcorrects for small alignment problems.

The Prior Art

The typical method which is used to read a card-key is to embed some form of metal contact which is connected to the dataport which the card-key is inserted into. While this is quite reasonable for making an electrical connection with the card-key, it can be subject to reliability problems. For example, metal contacts can become dirty and are sensitive to small misalignments.

Another method which is sometimes used to read card-key data is to encode the data on a magnetic stripe in the card. This method is less subject to the problems which are encountered with a metal contact, but it is still subject to reliability problems of a different kind. For example, magnetic strips are sometimes difficult to read and are still sensitive to small misalignments. Also, magnetic strips are subject to being degaussed by juxtaposition with each other or with any other strong magnet. Primarily, however, the amount of data stored in a magnetic stripe is severely limited, and no data access to an embedded computer chip is provided.

Objects of the Invention

Therefore, it is an object of the present invention to provide an improved method and device for data-connection between card-key embedded microprocessors and computer-based security systems.

It is a second object of the present invention to improve the reliability of computer-based security systems, by providing an optical card-key data connection which is minimally subject to mechanical wear and tear.

It is yet a third object of the present invention to improve the reliability of computer-based security systems, by providing a magnetic card-key connection which self-corrects for small alignment problems.

These and other objects of the present invention will become clear after an examination of the drawings, the description, and the claims herein.

SUMMARY OF THE INVENTION

A card-key device with an embedded microprocessor, inserted into a data-entry port, is able to communicate with a computer-based security system via an optical connection. The optical connection uses two or more optical data connectors, each of which uses a light-emitting diode to send signals and a phototransistor to receive them. The light-emitting diode and phototransistor are linked via a "light tunnel" made by the mechanical positioning of the card-key; this assures that the card-key is correctly placed in its slot and can be supplied with electrical power before data transmission will take place.

One end of the card-key attaches to an arrangement of a permanent magnet and an electrically-conducting flexible clip. This arrangement helps to assure that the card-key is correctly placed and that it stays in place for data transmission. The electrically-conducting clip is used to conduct power to the card-key for its on-board computing, while the magnetic attachment is used to assure a good electrical contact.

The card-key's on-board microprocessor can be used either to transmit stored data, such as an identifying card-key number, or to record data which the security system stores on the key, or to perform a specified data transformation for the security system, such as matching a human-entered personal identifier number with an internal code number. Use of a microprocessor and its writable memory, rather than a read-only storage device, adds flexibility and reliability to the card-key's access control function.

SUMMARY OF THE DRAWINGS

FIG. 1 is a view of the card-key as it is inserted/removed from the data-entry port.

FIG. 2 is a bottom view of the card-key and its connector in the data-entry port.

FIG. 3 is a bottom view of the internal construction of the card-key.

FIG. 4 is an end view of the electrical connectors of the card-key.

FIG. 5 is a side view of the card-key.

DETAILED DESCRIPTION

Optical Connection

Figure 6:
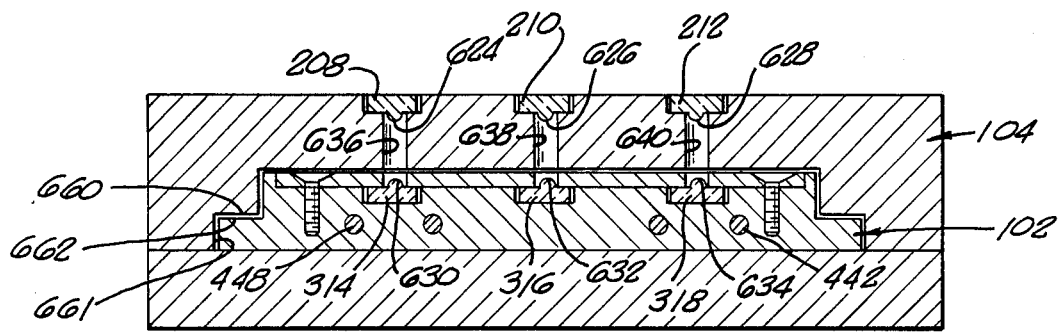
FIG. 6 is a cross-sectional view of the electrical and optical connection between the card-key and the data-entry port, taken along the line 6—6 of FIG. 2.

Referring now to FIGS. 1–3, the mechanical orientation and optical connection of the card-key and the data-entry port are disclosed. The card-key 102 is inserted horizontally into a card receptacle 104 in the data-entry port 106. An optical connection is made between light-emitting diode 210 and phototransistors 208, 212 in the card receptacle of the data-entry port 104 on the one side, and phototransistor 316 and light-emitting diodes 314, 318 in the card-key 104 on the other side. (In a preferred embodiment, the distance between the optical elements of the card-key and the optical elements of the data-entry port may be about 150+/−15 mils, with about 7.5 mils axial displacement allowed.) This optical connection allows data to be sent between the security system's computing elements (not shown) to which the port 106 is connected and the card-key's onboard microprocessor 320. The card-key 102 stores its identifying number and any other data in an array of memory elements 322. (In a preferred embodiment, the microprocessor and its memory may comprise any standard TTL circuitry. Any standard data connection method, e.g. RS-232, may be used for communication between the data-entry port and the security system's computing elements.)

Referring now to FIG. 6, further details of the optical connection between the card-key 102 and the card receptacle 104 are disclosed. Each light-emitting diode and phototransistor 208-212 in the data-entry port is covered with an optical lens 624-628. Similarly, each light-emitting diode and phototransistor 314-318 in the card-key is covered with an optical lens 630-634. Each optical element with its lens is connected to its associated counterpart via a "light tunnel" 636-640. The light tunnel has more than one function—first, it prevents stray light and dust from interfering with signal transmission between optical element pairs; and second, it assures (due to its narrowness) that the optical elements have been properly aligned before any data transfer can take place. (In a preferred embodiment, the light-emitting diodes of both the card-key and the data-entry port may comprise Honeywell part SEP 8506-3; and the phototransistors of both the card-key and the data-entry port may comprise Honeywell part SEP 8406-3.).

Packaging

Referring now to FIG. 5, it is seen that the card-key is packaged in a slim case, about the size of a small pocket calculator. In a preferred embodiment, the case may comprise any standard plastic, e.g. ABS plastic. It may be held together with any standard fastening method, e.g. cadmium-plated steel screws. A ledge 660 forming a slot 661 (shown on FIG. 6) in the card receptacle slot 104 matches a slide 662 (shown on FIG. 6) on the card-key 102, so that the card-key cannot accidentally be inserted upside-down. The slide does not run the entire length of the card-key thus preventing the card from being inserted backwards.

Electrical Connection

Referring now to FIG. 4, the electrical connection between the card-key and the data-entry port is disclosed. Several electrical contacts 442-448 are placed at one end of the card-key, which is inserted into the data-entry port. In a preferred embodiment there are four contacts to better ensure that a clean electrical contact is made. These contacts are attracted by a magnetic element within the data-entry port (shown on FIG. 8), and come to touch an electrically-conductive pair of spring clips 756-758 (shown on FIG. 8) there. The spring clips connect the card-key to a power supply, which supplies power to the card-key's onboard microprocessor 320, memory elements 322, and any other electronic elements. This combination of magnetic elements and spring clips assures that the card-key will be correctly seated, providing both a good optical connection and a good electrical connection.

Figure 7:
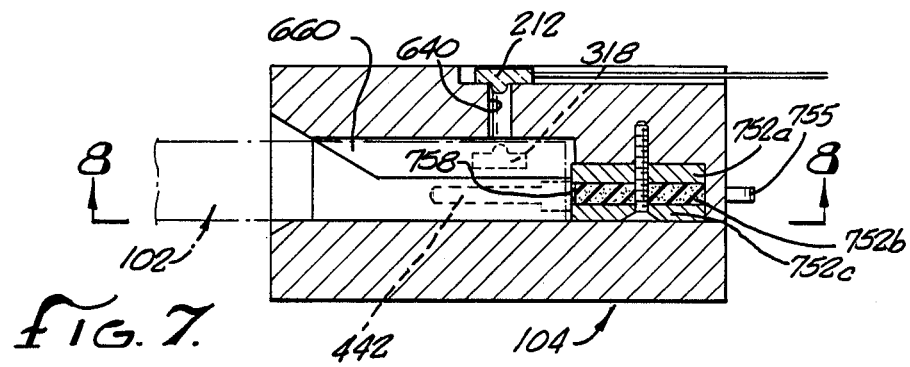
FIG. 7 is a cross-sectional view of the electrical and optical connection between the card-key and the data-entry port, taken along the line 7—7 of FIG. 2.
Figure 8:
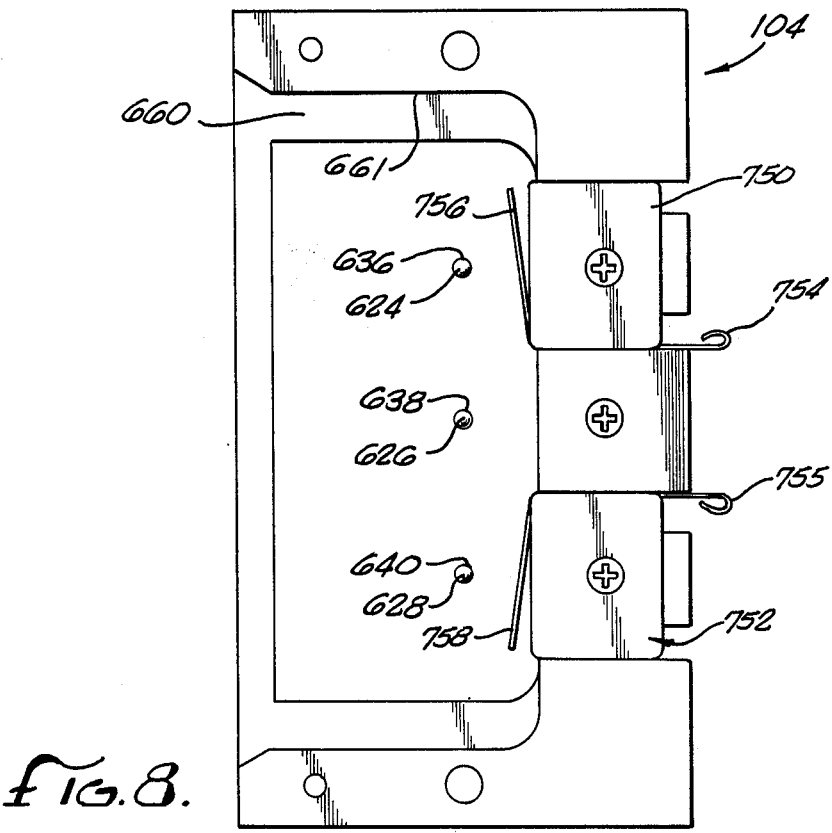
FIG. 8 is a cross-sectional view of the electrical and mechanical connection between the card-key and the data-entry port, taken along the line 8—8 of FIG. 7.

Referring now to FIGS. 7-8, further details of the electrical connection between the card-key and the data-entry port are disclosed. The magnetic elements 750-752 and the spring clips 756-758 are so positioned that when the card-key 102 is attracted to them its optical element 318 will be aligned properly with the optical element 212 of the data-entry port 106. The magnetic elements 750-752 cause the card-key to trigger the spring clips 756-758 and connect the card-key to a power source (not shown) via power connectors 754-755. Note that when the optical elements are aligned properly, the spring clip 758 will be positioned between the magnet pole pieces 752a, 752c, where the magnetic attractive force is strongest. In a preferred embodiment, the magnetic elements may comprise a permanent magnet, e.g. that sold by Bunting Magnetics Co. under the name "Plastiform" (TM), and soft iron poles. The spring clips 756-578 may comprise a gold-plated beryllium-copper alloy with a flexible contact. Note that due to the slight width and position of the light tunnel 764 and the flexibility of the spring clips 756-758, the electrical connection will always be made before the optical connection is made, and the card-key will always be supplied with power in time for data transmission.

Data Transfer

In a presently preferred embodiment of the invention, the card-key 102 carries on a data-transfer "dialogue" with the security system via its connection with the data-entry port 106. The microprocessor 320 will sense the presence of an electrical connection to the data-entry port and will indicate this to the data-entry port with a "ready" signal. The ready signal is sent by lighting one of the two light-emitting diodes 314-318 (for example, 314) on the card-key.

The security system will recognize this ready signal and respond by initiating a data transfer, using the light-emitting diode 208 in the data-entry port. It will use this light-emitting diode to send a command to the card-key 102 to present its identifying number or other stored data. The card-key will use the other light-emitting diode (for example, 318) to transfer data to the data-entry port. Thereafter the card-key and the system can communicate, each using its own light-emitting diode to send and its own phototransistor to receive signal bits.

The security system can order the card-key microprocessor 320 to transmit an identifying card-key number, or to record data in its on-board memory 322 and later retrieve it, or to perform a specified data transformation—such as matching a "personal identifier number," entered on a separate input device, with an internal code number.

It should be remembered that while a presently preferred embodiment has been disclosed, variations are possible which remain within the scope of the present invention.

What is claimed is:

1. In a card-key/card receptacle system, an electrical-magnetic latch and connector, comprising
first connective means for completing an electrical connection attached to the card key;
second connective means for completing an electrical connection attached to the card receptacle;

magnetic means for attracting the first connective means to the second connective means, whereby sliding the first connective means nearby to the second connective means causes an electrical connection to be maintained by an attractive force; and spring means for maintaining said first and second connective means in substantial mechanical alignment, whereby said electrical connection is not broken by small lateral forces.

2. In a card-key system, an optical-magnetic latch and data connection, comprising optical emitter means for emitting a light pulse;

optical receiver means for sensing the light pulse; wherein said optical emitter means and said optical receiver means are movable with respect to each other and orthogonal to said light path;

light tunnel means for transmitting the light pulse from the emitter means to the receiver means, whereby no light path is formed until the emitter means and the receiver means are optically aligned to substantially within a predetermined tolerance;

first connective means for completing an electrical connection, seated on the same housing as the emitter means;

second connective means for completing an electrical connection, seated on the same housing as the receiver means;

magnetic means for attracting the first connective means to the second connective means, whereby sliding the emitter means nearby to the receiver means causes an electrical connection to be made and maintained substantially before any optical connection is formed; and spring means for mechanically maintaining said optical emitter means and said optical receiver means in substantial optical alignment.

3. In a card-key system, an optical-magnetic latch and data connection, comprising optical emitter means for emitting a light pulse;

optical receiver means for sensing the light pulse; wherein said optical emitter means and said optical receiver means are movable with respect to each other and orthogonal to said light path;

light tunnel means for transmitting the light pulse from the emitter means to the receiver means, whereby no light path is formed until the emitter means and the receiver means are optically aligned to substantially within a predetermined tolerance;

first connective means for completing an electrical connection, seated on the same housing as the emitter means;

second connective means for completing an electrical connection, seated on the same housing as the receiver means;

magnetic means for attracting the first connective means to the second connective means, whereby sliding the emitter means nearby to the receiver means causes an electrical connection to be made and maintained substantially before any optical connection is formed;

having at least one card-key and at least one card receptacle, and further comprising data communication means capable of data transfer in both directions between and said card-key and of said card receptacle, wherein each said card-key comprises at least one said optical emitter means, and wherein each said card receptacle comprises at least one said optical emitter means.

and further comprising spring means for maintaing said first and second connective means in substantial mechanical alignment, whereby said electrical connection is not broken by small lateral forces, and for mechanically maintaining said optical emitter means and said optical receiver means in substantial optical alignment.

wherein said attractive force by said magnetic means maintains said optical emitter means and said optical receiver means in substantail optical alignment.

* * * * *